US006783782B1

United States Patent
Larsen et al.

(10) Patent No.: US 6,783,782 B1
(45) Date of Patent: Aug. 31, 2004

(54) GROOVED FREEZER-TO-OVEN PIZZA CRUST

(75) Inventors: Michelle M. Larsen, Woodbury, MN (US); Dennis A. Lonergan, Medina, MN (US)

(73) Assignee: The Pillsbury Company, Minneapolis, MN (US)

( * ) Notice: Subject to any disclaimer, the term of this patent is extended or adjusted under 35 U.S.C. 154(b) by 0 days.

(21) Appl. No.: 09/215,583

(22) Filed: Dec. 17, 1998

(51) Int. Cl.[7] .............................................. A21D 10/02
(52) U.S. Cl. ..................... 426/76; 426/94; 426/144; 426/275; 426/283; 426/391; 426/496; 426/503
(58) Field of Search ..................... 426/76, 94, 144, 426/391, 496, 503, 275, 283

(56) References Cited

U.S. PATENT DOCUMENTS

| 707,528 | A | | 8/1902 | Wolfinger |
|---|---|---|---|---|
| 4,464,405 | A | * | 8/1984 | De Christopher ........... 426/391 |
| 4,563,946 | A | | 1/1986 | Barlow et al. |
| 4,659,303 | A | | 4/1987 | Straka et al. |
| 4,698,228 | A | | 10/1987 | Straka et al. |
| 5,076,434 | A | | 12/1991 | Hoffman, Jr. |
| 5,171,590 | A | * | 12/1992 | Sluimer ........................ 426/19 |
| 5,351,608 | A | | 10/1994 | Muchin et al. |
| 5,416,950 | A | | 5/1995 | Dornbush et al. |
| 5,438,916 | A | | 8/1995 | Dornbush et al. |
| 5,447,738 | A | * | 9/1995 | De Bruijne et al. ......... 426/549 |
| 5,503,063 | A | | 4/1996 | Sebald |
| 5,503,860 | A | | 4/1996 | Donnelly et al. |
| 5,520,096 | A | | 5/1996 | Dornbush et al. |
| D371,043 | S | | 6/1996 | Gannon |
| 5,526,735 | A | | 6/1996 | Hacker et al. |
| D374,148 | S | | 10/1996 | Woodward et al. |
| 5,720,998 | A | * | 2/1998 | Proctor et al. ................ 426/94 |
| 5,830,519 | A | * | 11/1998 | Telfer et al. ................. 426/144 |

FOREIGN PATENT DOCUMENTS

CN 301197 3/1997

* cited by examiner

Primary Examiner—Lien Tran
(74) Attorney, Agent, or Firm—Faegre & Benson LLP

(57) ABSTRACT

A grooved, pre-proofed, freezer-to-oven pizza crust dough. The dough includes a top surface for a pizza filling, and a bottom surface opposing the top surface and contacting a pizza pan. The bottom surface of the dough defines a plurality of grooves which provide the dough with a uniformly cooked surface upon baking the dough.

21 Claims, 1 Drawing Sheet

GROOVED FREEZER-TO-OVEN PIZZA CRUST

BACKGROUND OF THE INVENTION

The present invention relates to a grooved pizza crust and to a method for making the grooved pizza crust.

Pizza is a food product that continues to increase in popularity and in the varieties of pizzas that are available. "Thick crust" pizza is one type of pizza that has increased in popularity over the last several years. Thick crust pizza includes a crust component and a filling or topping component. The crust component of a thick crust pizza is significantly thicker and may be deeper than the crust of a traditional pizza.

Thick crust pizza is traditionally made by applying a layer of edible oil onto the bottom of a pan in order to impart a crisp texture to the crust. The oil also assists a consumer in removing the pizza from the pan after the crust has been baked. A pizza dough is then placed in the pan and is proofed, or allowed to rise, in the pan, substantially filling the bottom and sides of the pan. This proofing step imparts the desired texture and thickness attributes associated with thick crust pizzas. The dough is then baked in the pan, and the oil in the bottom of the pan imparts a crispy, fried-like texture to the bottom of the crust.

Due to the increasing popularity of thick crust pizzas, it has become advantageous for retail pizza outlets or pizzerias to use pre-proofed, freezer-to-oven pizza crusts to reduce the time involved in mixing, proofing, then baking, a thick crust pizza dough from scratch. The expression "pre-proofed," as used herein, shall be used to indicate that the dough is proofed prior to being frozen. The expression "freezer-to-oven," as used herein, shall be used to mean that the frozen dough does not need to be thawed prior to baking in order to result in a desirable baked product. Using pre-proofed freezer-to-oven pizza crusts also reduces the cost associated with excess pizza dough, since the pizzeria can simply remove a crust from the freezer, place it in a pan containing oil, top it and bake it to fill each customer's order, rather than having to estimate how much dough will need to be proofed or thawed at the beginning of the day in order to fill every customer's order that day. Without the use of pre-proofed, freezer-to-oven pizza crusts, pizzerias often face running out of proofed or thawed dough before the end of the day, or having excess proofed or thawed dough which cannot be re-used but must be thrown away at the end of the day.

Despite the advantages of pre-proofed, freezer-to-oven pizza crusts, it has been difficult for the retail baker to obtain the same crisp, uniform texture on the bottom of the crust as obtained when using a freshly prepared pizza dough crust.

One major disadvantage of using a pre-proofed, freezer-to-oven pizza crust dough is uneven heating of the bottom surface of the dough during baking. The uneven heating is believed to occur because of water vapor released from the dough during baking, which is trapped between the bottom surface of the dough and the pan. The water vapor cannot escape from the bottom of the dough due to the presence of oil in the pan, which effectively forms a seal between the pre-proofed frozen dough piece and the pan. The seal traps the water vapor under the dough and has an insulating effect between the bottom surface of the dough and the pan.

The seal or sealing effect caused by the oil is believed to occur specifically with pre-proofed freezer-to-oven dough because the dough piece is rigid (frozen) when it is placed in the pan containing the oil, and the dough piece is sufficiently large to substantially fill the pan. The dough sticks to the oil, leaving little or no air space between the dough and the pan. As a result, water vapor that is generated during baking is trapped and cannot escape from the bottom of the pan.

The most noticeable outcome of this uneven heating is the non-uniform texture and color of the bottom surface of the baked pizza crust. Rather than being uniformly crisp and browned like a freshly prepared pizza crust, the bottom surface of a crust baked from pre-proofed, frozen dough can be soggy and pale, particularly near the center of the crust, resulting in an unappealing product which does not meet the expectations of the pizzeria customers.

U.S. Patent No. 5,503,063, issuing Apr. 2, 1996, describes a pizza crisper that is formed from aluminum sheet metal. The crisper includes a bottom portion and an annular rim, which rises above the bottom portion. The bottom portion is perforated and includes a succession of annular bands separated by annular grooves, which can be bridged by pizza dough. This type of pizza crisper is not suitable for a thick crust or pan pizza because the holes in the bottom of the pan or crisper cause oil to leak out.

The Hoffman, Jr. patent, U.S. Pat. No. 5,076,434, issuing Dec. 31, 1991, describes a pizza dough shell container. The container includes a circular rim and a framework with a series of circular bars spaced apart to form openings and radially directed bars. U.S. Pat. No. D,371,043, issuing Jun. 25, 1996, describes a brick baking rack. The brick baking rack imparts a brick-like pattern in a pan.

The Muchin et al. patent, U.S. Pat. No. 5,351,608, issuing Apr. 4, 1994, describes a baking device that has surface texturing. The surface features provide the baking surface with a non-stick effect.

SUMMARY OF THE INVENTION

The present invention includes a pre-proofed, freezer-to-oven dough. The dough includes a top surface suitable for receiving a pizza filling or topping, and a bottom surface opposing the top surface. The bottom surface includes a plurality of grooves.

The present invention also includes a method of imparting a crisp texture to a bottom surface of a pre-proofed, freezer-to-oven pizza dough upon baking the dough. The method includes proofing a pizza dough to create a top surface and a bottom surface on the dough, and imparting grooves to the bottom surface of the dough. The dough is frozen before or after the grooves are imparted to the bottom surface of the dough.

The present invention further includes a mold for imparting grooves in a dough piece. The mold includes a main body with an upper surface, and a plurality of ridges extending upwardly from the upper surface.

DETAILED DESCRIPTION OF PREFERRED EMBODIMENTS

Figure 1:
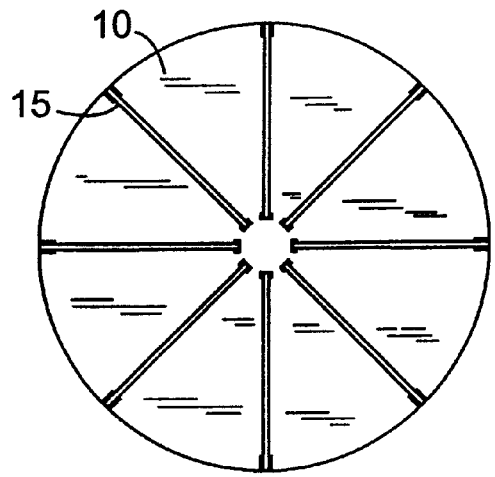
FIG. 1 is a plan view of one embodiment of a mold used to impart grooves on a bottom portion of a dough.

Preparing a thick crust pizza from a pre-proofed, freezer-to-oven dough that is acceptable to consumers has eluded pizza and other food manufacturers because, until the present invention, pre-proofed frozen thick crust pizza dough could not duplicate desirable organoleptic features of freshly proofed and baked thick crust pizza, such as texture and color. In particular, a pre-proofed, frozen thick crust pizza dough, upon baking, has displayed uneven crispness, sogginess and an uneven brownness due to uneven heating of the bottom surface of the dough during baking.

As discussed in the Background, numerous methods have been tried to address this problem. One additional method has included the placement of a copper tube in the center of a crust to allow the escape of gases through the tube during baking.

It has surprisingly been found that the addition of slits or grooves in the bottom of a pre-proofed, frozen pizza dough substantially eliminates the problem of uneven browning and sogginess upon baking the dough. Surprisingly, the grooves or slits are maintained during at least part of the baking process rather than closing as the dough thaws during the early part of baking. Preferably, the grooves or slits are maintained throughout baking and can be seen on the bottom surface of the final baked product. The slits or grooves permit the release of vapors produced during baking to vent from underneath the bottom surface of the dough. The result is a thick crust pizza product, made from a pre-proofed, freezer-to-oven pizza dough, having the desired uniform crispness and brownness features of a freshly proofed and baked product.

The grooves are imparted to the bottom surface of the dough during the manufacture of the pre-proofed frozen dough. The method for manufacturing a pre-proofed frozen dough for pizza crusts involves preparing a dough piece from any pizza dough formula, then placing the dough piece in a pan. The pan may be of any size and shape, but is typically round for pizza dough crusts. For thick crust pizza dough, the pan also has a sidewall to support the dough thickness ultimately achieved. The dough in the pan is then proofed to substantially fill the pan. The proofed dough may then be shaped to accommodate pizza or other toppings or fillings. The proofed dough is then frozen, removed from the pan, packaged, and stored or distributed under frozen conditions.

The grooves can be cut or notched into the proofed dough piece after it has been frozen, prior to packaging the dough piece. Alternatively, a proofed dough piece can be placed on a mold having ridges corresponding to the grooves to be imparted to the dough piece, then frozen on the mold and removed after freezing for further processing. Another alternative is to place an unproofed dough piece on a mold placed in a pan or integral with the pan, then to proof and freeze the dough piece on the mold, after which the mold can be removed from the proofed frozen dough piece, and the frozen dough can be further processed.

Preferably, the grooves are imparted to the bottom surface of the dough prior to freezing the dough. The freezing step acts to "set" the grooves in the dough structure, so the grooves can provide the desired venting of water vapor during baking. Because a proofed dough piece is relatively delicate, it is also desired to minimize handling the proofed dough before it is frozen. Therefore, the last alternative described above, in which the dough is proofed and frozen in contact with the mold, is the more preferred method of imparting grooves to the dough.

The end consumer can then remove a pre-proofed, frozen dough crust from the freezer without needing to thaw the dough, place it in a pan containing oil, with the grooved bottom surface of the crust in contact with the bottom of the pan and the oil, apply toppings to the top surface of the crust, and bake the pizza to provide a thick crust pizza with a crisp, uniformly browned bottom surface. The grooves permit the venting of water vapor in the bottom of the pan, so that the oil in the pan and the dough can interact to result in the uniform, crisp, fried-like texture of the crust typically found in freshly prepared thick crust pizzas.

Alternatively, the end consumer can simply place the pre-proofed frozen dough crust on a pan or baking sheet without oil prior to baking. Baking a pizza dough crust of the present invention without oil results in a uniformly baked bottom surface due to the venting of water vapor from the dough during baking.

As described above, the grooved pizza crust dough of the present invention can be of any desired size or shape. The desired size and shape will determine the number, dimensions and positioning of the grooves on the bottom surface of the dough. It is preferred that there be a sufficient number grooves to adequately vent the water vapor from the bottom surface of the dough to result in a crisp texture upon baking the dough. For example, a higher moisture dough formula may require a greater number of grooves as compared to a lower moisture dough formula. The grooves should be of sufficient depth in the bottom surface of the dough to retain their structure during at least the initial stages of baking, when the surface of the dough is set, so that the grooves retain their venting function during at least part of the remaining baking process. Therefore, for a relatively thicker crust, it may be necessary to provide grooves with a greater depth than would be needed for a relatively thinner crust. The grooves should be positioned on the bottom surface of the dough so that the venting is uniform across the bottom surface, since this results in the desired uniform brownness on the bottom surface of the dough.

Thick crust pizzas are typically round, although they may also be rectangular in shape. For round pizzas, the grooves are preferably imparted to the bottom surface of the dough as equally spaced radii extending from the center of the dough piece and radiating outwardly. More preferably, the grooves extend out from the center of the dough all the way to the outer circumference of the dough, so that the grooves provide a pathway for water vapor to escape from the center of the dough to the external environment surrounding the dough during baking. In another embodiment, the grooves extend from the center of the dough up the sides of the dough piece to provide this pathway for vapors to escape during baking.

For rectangular shaped crusts, the grooves are preferably imparted to the bottom surface of the dough in a grid or other pattern so that each groove provides a pathway for water vapor to escape from the center of the dough to the external environment.

As described previously, a mold or forming device can be used to impart the grooves to the bottom surface of the dough. In one embodiment, the mold is a flat, rigid main body having ridges extending upwardly from the top surface of the mold. The ridges can be integral with the main body, or they can be separately attached to vary the number of grooves imparted to the dough piece by the mold. The ridges can be of any cross-sectional shape desired, as long as the grooves resulting from the ridges remain open during at least part of the baking step to vent gases. In one embodiment, the ridges were made from stainless steel wires having a ⅛-inch diameter, placed radially along the upper surface of a round main body disk made out of stainless steel.

In another embodiment, the pizza pan itself can function as the mold or forming device. In this embodiment, the ridges are formed directly in the bottom of the pan itself, so that upon proofing and freezing the dough in the pan, the grooves are formed without the need for additional molds or forming devices.

The grooves can also be imparted to the pizza dough by hand, or by a combination of a mold and by hand. For example, grooves can be imparted to the bottom surface of the dough using a mold, and then to the sides of the dough piece by hand.

Figure 2:
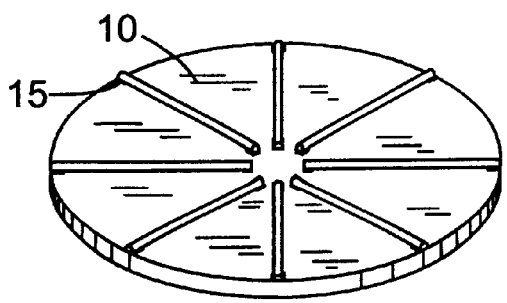
FIG. 2 is a side elevational view of the mold shown in FIG. 1.
Figure 3:
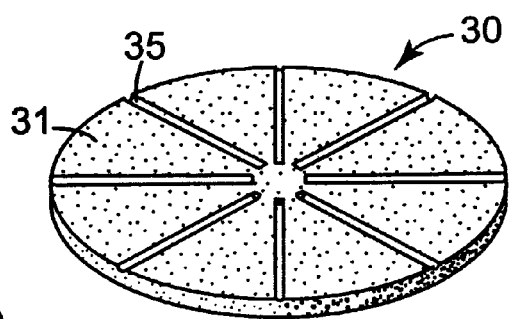
FIG. 3 is a side elevational view of an inverted baked pizza crust that includes grooves on its bottom surface.
Figure 4:
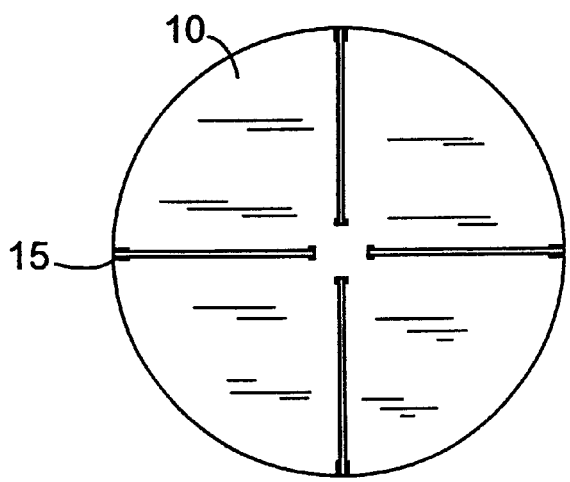
FIG. 4 is a plan view of another embodiment of a mold used to impart grooves on a bottom portion of a pizza dough.

One embodiment of a pizza dough mold of the present invention is shown in FIGS. 1 and 2. FIG. 1 shows a mold body 10 having a plurality of radial ridges 15 to apply grooves to a bottom surface of a pizza dough to be used as a crust for a thick crust pizza. In this particular embodiment, eight uniformly spaced radial ridges are shown, although the number of the ridges will vary depending on the diameter of the crust. FIG. 2 is a side elevational view of the mold 10 of FIG. 1. The bottom surface 31 of a dough piece 30 made with the mold 10 of FIG. 1 is illustrated in FIG. 3. The dough piece 30 shown in FIG. 3 is turned upside down to show the grooved bottom surface 31. The grooves 35 may or may not be visible on the bottom surface 31 of the dough 30 after it has been baked. It has also been found that a use of fewer ridges 15 on the mold body 10, such as is illustrated in FIG. 4, results in a pizza crust which has improved characteristics as compared to a crust that does not have any grooves, indicating that any number of grooves in the dough will tend to improve the texture and appearance of a pizza crust compared to an ungrooved pizza crust.

The examples presented below are presented to further describe the present invention, but are not presented to limit the present invention.

EXAMPLE 1

A comparison of thick crust pizzas made from the grooved, pre-proofed, freezer-to-oven dough of the present invention to thick crust pizzas made from freshly proofed dough was performed.

To form the grooved, pre-proofed frozen dough crusts of the present invention, a pizza dough was prepared by combining flour, water, yeast, oil and minor ingredients. The dough was rolled out and cut into three round pizza crust pieces, each approximately six inches in diameter. The cut dough pieces were then placed in three six-inch diameter pizza pans and allowed to proof until the dough was about ¾-inch thick in each pan. The proofed dough was then stamped to form an edge on the crust. The panned, proofed dough was then placed in a blast freezer at −40° F. for about 30 minutes to freeze the dough pieces. The frozen dough pieces were then removed from the pans. On the bottom surface of two of the dough pieces, four radially symmetrical grooves were cut into the frozen dough with a sharp knife. The grooves extended from the center of the dough piece out to the edge of the dough piece. All the frozen dough pieces were then packaged and stored in a freezer at 0° F.

The control dough crusts were made by placing 7 g of oil in each of three six-inch diameter pizza pans. An unproofed, frozen dough piece was placed in each pan, and the dough pieces were allowed to thaw. After the dough pieces had thawed, they were proofed to a thickness of about ¾-inch each, and were stamped with the stamper to form an edge on the crust.

The dough crusts were then topped and baked. The grooved, pre-proofed, freezer-to-oven dough crusts of the present invention were removed from the freezer and placed in six-inch diameter pans, each containing 7 g of oil. The control dough crusts and the crusts of the present invention were then each topped with the same amount of sauce and cheese, and each pizza was baked at 500° F. for 6 minutes and 45 seconds.

The pizza crust made from the control dough was an even golden brown color on the bottom surface, indicating that the bottom surface had heated uniformly during baking. The grooved crusts of the present invention were also a golden brown color on the bottom surface, while the crust baked from the ungrooved, pre-proofed, frozen dough was not uniformly browned and had a pale center on the bottom surface.

EXAMPLE 2

The same comparison was done in Example 2 as in Example 1, except the grooved, pre-proofed, frozen dough crusts of the present invention had eight grooves instead of four on the bottom surface.

Upon baking, the pizza crust made from the control dough was an even golden brown color on the bottom surface. The pizza crust baked from the grooved, pre-proofed frozen dough of the present invention also had a uniform golden brown color on the bottom surface. The crust baked from the ungrooved, pre-proofed frozen dough was browned on the edges but had a pale center on the bottom surface.

These Examples show that the grooved, pre-proofed, freezer-to-oven dough crusts of the present invention result in baked pizza crusts that very closely resemble pizza crusts baked from a freshly proofed dough. The number of grooves on the bottom surface of the dough determines the uniformity of heat transfer across the bottom surface of the dough. The grooves allow the gases trapped between the bottom surface of the dough and the pan to escape during baking. Because these gases can escape, the gases are not acting as an insulator to the bottom surface of the crust, so the bottom of the crust is more uniformly heated.

Although the present invention has been described in terms of pizza dough, it is to be understood that this invention may be applied to other dough products that are to be baked, such as foccacia and other flat bread types of products, in which a uniform color and texture across the bottom surface are desired.

The above specification and examples provide a complete description of the manufacture and use of the grooved, pre-proofed, freezer-to-oven dough crusts of the present invention. Since many embodiments of the invention can be made without departing from the spirit and scope of the invention, the invention resides in the claims hereinafter appended.

What is claimed is:

1. A pre-proofed, frozen dough comprising a top surface and a bottom surface intended to be in contact with a cooking surface opposing the top surface, wherein the bottom surface defines a plurality of grooves.

2. The dough of claim 1, wherein the dough has a circular shape and the grooves extend as radii from a center of the dough.

3. The dough of claim 2, wherein the bottom surface of the dough has eight grooves.

4. The dough of claim 2, wherein the bottom surface of the dough has four grooves.

5. The dough of claim 1, wherein the grooves extend to the top surface of the dough.

6. A method of making a pre-proofed, frozen dough capable of attaining a uniformly cooked bottom surface upon baking the dough on a cooking surface, comprising:

proofing a dough piece having a top surface and a bottom surface intended to be in contact with the cooking surface;

imparting a plurality of grooves on the bottom surface of the dough; and freezing the dough.

7. The method of claim 6, further comprising the step of freezing the dough after proofing the dough.

8. The method of claim 6, further comprising the step of forming the dough into a circular shape.

9. The method of claim 8 wherein the grooves extend as radii from a center of the bottom surface of the dough.

10. The method of claim 6, further comprising the step of forming the dough into a rectangular shape.

11. The method of claim 10 wherein the grooves are imparted to provide a grid pattern on the bottom surface of the dough.

12. A pre-proofed frozen pizza dough having a central region and an outer edge and adapted for baking on a cooking surface, including:

a top surface; and a bottom surface intended to be in contact with the cooking surface when the pizza dough is baked, the bottom surface including a plurality of grooves extending from the central region to the outer edge to enhance the venting of vapors between the bottom surface of the dough and the cooking surface when the dough is baked.

13. The pre-proofed frozen pizza dough of claim 12 and further including:

pizza toppings on the top surface; and the cooking surface in contact with the bottom surface.

14. The pre-proofed frozen pizza dough of claim 13 and further including cooking oil on the cooking surface.

15. A method for making a pre-proofed frozen pizza dough capable of attaining a relatively uniformly cooked bottom surface when the dough is baked on a cooking surface, including:

proofing a pizza dough piece having a top surface, a bottom surface intended to be in contact with the cooking surface, a central region and an outer edge;

forming a plurality of grooves on the bottom surface of the dough, the grooves extending from the central region to the outer edge; and freezing the dough.

16. The method of claim 15 wherein the grooves are formed in the bottom surface of the dough before the dough is frozen.

17. The method of claim 15 wherein forming the grooves includes molding the grooves on the bottom surface of the dough.

18. The method of claim 17 wherein the grooves are molded on the bottom surface of the dough before the dough is frozen.

19. The method of claim 17 wherein:

molding the grooves includes placing the bottom surface of the dough in contact with a groove mold; and the dough is proofed and frozen while in contact with the groove mold.

20. The method of claim 15 and further including placing the bottom surface of the dough in contact with the cooking surface.

21. The method of claim 20 and further including applying cooking oil on the cooking surface.

* * * * *